United States Patent
Li et al.

(10) Patent No.: US 9,214,838 B2
(45) Date of Patent: Dec. 15, 2015

(54) BRUSHLESS MOTOR AND ELECTRIC DEVICE MOUNTED WITH SAME

(75) Inventors: Hu Li, Osaka (JP); Yuichi Yoshikawa, Osaka (JP); Yuichiro Tashiro, Osaka (JP); Hideaki Matsuo, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 256 days.

(21) Appl. No.: 13/981,565

(22) PCT Filed: Jan. 25, 2012

(86) PCT No.: PCT/JP2012/000443
§ 371 (c)(1),
(2), (4) Date: Sep. 16, 2013

(87) PCT Pub. No.: WO2012/102030
PCT Pub. Date: Aug. 2, 2012

(65) Prior Publication Data
US 2014/0001906 A1    Jan. 2, 2014

(30) Foreign Application Priority Data

Jan. 28, 2011  (JP) ................... 2011-016043
Jan. 28, 2011  (JP) ................... 2011-016044

(51) Int. Cl.
| H02K 21/12 | (2006.01) |
| H02K 1/22 | (2006.01) |
| H02K 1/27 | (2006.01) |
| H02K 29/03 | (2006.01) |
| H02K 1/14 | (2006.01) |

(52) U.S. Cl.
CPC .................. *H02K 1/22* (2013.01); *H02K 1/276* (2013.01); *H02K 29/03* (2013.01); *H02K 1/146* (2013.01); *H02K 2201/03* (2013.01); *H02K 2213/03* (2013.01)

(58) Field of Classification Search
CPC ......... H02K 1/276; H02K 1/22; H02K 1/146; H02K 2213/03
USPC ............................ 310/156.53, 156.56, 156.57
See application file for complete search history.

(56) References Cited

U.S. PATENT DOCUMENTS

| 7,282,827 B2 * | 10/2007 | Futami ..................... 310/156.48 |
| 7,425,786 B2 * | 9/2008 | Hino et al. ............... 310/156.57 |
| 8,040,010 B2 * | 10/2011 | Kamiya et al. ........... 310/156.57 |
| 2006/0273678 A1 | 12/2006 | Futami |
| 2008/0018190 A1 | 1/2008 | Takahata et al. |
| 2010/0119390 A1 | 5/2010 | Baba et al. |
| 2010/0244609 A1 | 9/2010 | Takahata et al. |
| 2012/0169267 A1 * | 7/2012 | Nashiki et al. ................. 318/701 |

FOREIGN PATENT DOCUMENTS

| JP | 11-187597 A | 7/1999 |
| JP | 2002-112479 A | 4/2002 |

(Continued)

OTHER PUBLICATIONS

International Search Report for International Application No. PCT/JP2012/000443, dated Feb. 28, 2012, 2 pages.

*Primary Examiner* — Hanh Nguyen
(74) *Attorney, Agent, or Firm* — Brinks Gilson & Lione

(57) ABSTRACT

A brushless motor capable of high speed rotation by field weakening operation is designed to reduce torque ripple at a maximum load point with current phase advance so that the torque ripple at the maximum load point is 1 to 1.5 times the torque ripple at a low speed load point.

11 Claims, 4 Drawing Sheets

(56) References Cited

FOREIGN PATENT DOCUMENTS

| JP | 2006-014450 A | 1/2006 |
|----|---------------|--------|
| JP | 2008-029095 A | 2/2008 |
| JP | 2008-167583 A | 7/2008 |
| JP | 2009-081909 A | 4/2009 |
| JP | 4248984 B2 | 4/2009 |
| JP | 2010-110142 A | 5/2010 |
| WO | WO 2008/105049 A1 | 9/2008 |

\* cited by examiner

BRUSHLESS MOTOR AND ELECTRIC DEVICE MOUNTED WITH SAME

This application is a 371 application of PCT/JP2012/000443 having an international filing date of Jan. 25, 2012, which claimes priority to JP2011-016044 filed Jan. 28, 2011 and JP2011-016043 filed Jan. 28, 2011, the entire contents of which are incorporated herein by reference.

TECHNICAL FIELD

The present invention relates to a permanent magnet brushless motor.

BACKGROUND ART

Conventionally, a voltage induced in the permanent magnet brushless motor is determined by a constant magnetic flux generated by the permanent magnet arranged in a rotor and an angular velocity of an electric motor. In other words, the induced voltage increases in proportion to a speed of the brushless motor. However, when the induced voltage exceeds an inverter's supply voltage, the speed of the brushless motor cannot be increased any more.

Advancing a phase of a current supplied to the brushless motor relative to that of the induced voltage allows more currents to be supplied even with a high induced voltage so that the speed of the brushless motor can be increased.

Such control is called field weakening and has been conventionally known as a technique to extend a high speed operating region. However, advancing the phase of the current relative to that of the induced voltage, in other words, advancing the phase angle of the current, changes a phase relationship between the current and a magnetic flux in air gaps, which increases torque ripple and causes a problem of vibration and noise.

In one conventional technique to reduce the torque ripple in an interior permanent magnet rotor having permanent magnets embedded inside a generally cylindrical rotor, a plurality of slits are formed in the rotor core such as to extend from vicinity of the radially outer side of the magnet of each pole to vicinity of the surface of the rotor.

Further, the plurality of slits are arranged substantially parallel to a radial direction of a pole center and at substantially equal intervals, to reduce the torque ripple, and in turn, to reduce noise and vibration (see, for example, Patent Literature 1).

On the contrary, another method has been proposed, wherein a plurality of slits are formed such as to direct magnetic fluxes emanating from the magnets to converge outside the rotor core laminations, and the converging direction is differed for each of the rotor core laminations, to compensate for a decrease in the rotor characteristics caused by magnetic saturation, and to reduce noise and vibration caused by the torque ripple (see, for example, Patent Literature 2).

In another method that has been proposed, an outer thin portion formed between a radial outer end of slits and the outer circumference of the rotor core is made gradually larger from a pole center toward interpolar portions, so as to reduce a high frequency component in the waveform of the magnetic flux density of the interpolar portions, and to reduce the high frequency component of the induced voltage and cogging torque (see, for example, Patent Literature 3).

In another method that has been proposed to reduce noise and vibration, a plurality of slits are arranged at substantially equal intervals at the radial outer end, wherein, while the interval between the plurality of slits is made larger at the radial inner end in a center portion of the permanent magnet, the interval is made smaller from the center portion toward the ends, to reduce counteracting magnetic flux of an armature, and to improve magnetic flux distribution in the outer circumference of the core (see, for example, Patent Literature 4).

However, while the conventional techniques in these documents can reduce noise and vibration to some extent in normal operation, i.e., without field weakening, these techniques cannot effectively reduce noise and vibration during field weakening with phase advance.

Conventionally, the torque ripple may exceed about 100% when the current phase angle is largely advanced at a highest speed load point during field weakening operation. This is an about five to six times increase in torque ripple as compared to that during low speed operation without any large phase advance.

The present invention has been made to solve this problem and provides a brushless motor capable of high speed rotation by field weakening, which outputs large torque with low noise and low vibration while maintaining mechanical strength.

PTL 1: Unexamined Japanese Patent Publication No. 11-187597
PTL 2: Unexamined Japanese Patent Publication No. 2006-14450
PTL 3: Unexamined Japanese Patent Publication No. 2008-167583
PTL 4: Japanese Patent No. 4248984

SUMMARY OF THE INVENTION

The present invention provides a brushless motor capable of high speed rotation by field weakening operation, characterized in that torque ripple at a highest speed load point is 1 to 1.5 times torque ripple at a low speed load point.

As the motor is configured such that the torque ripple is not increased significantly when a current phase angle is advanced at the highest speed load point during the field weakening operation, noise and vibration in a high speed region are reduced, so that low noise, low vibration operation can be realized in the entire operating range.

DETAILED DESCRIPTION OF THE PREFERRED EMBODIMENT

Figure 1:
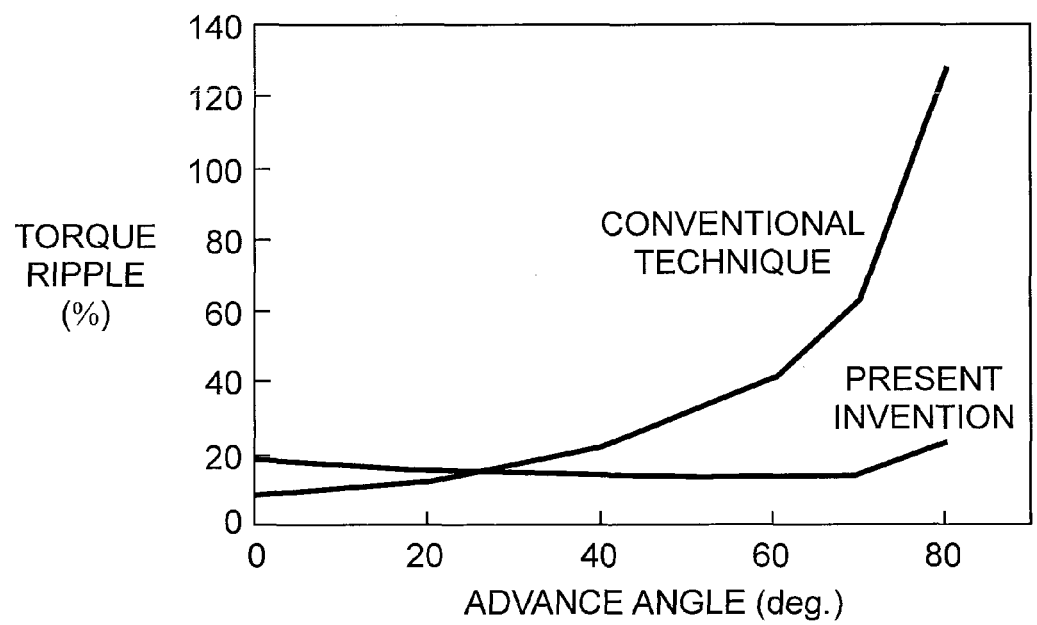
FIG. 1 is a diagram showing the relationship between current phase advance angle and torque ripple of a brushless motor according to a first exemplary embodiment of the present invention and a conventional brushless motor.
Figure 2:
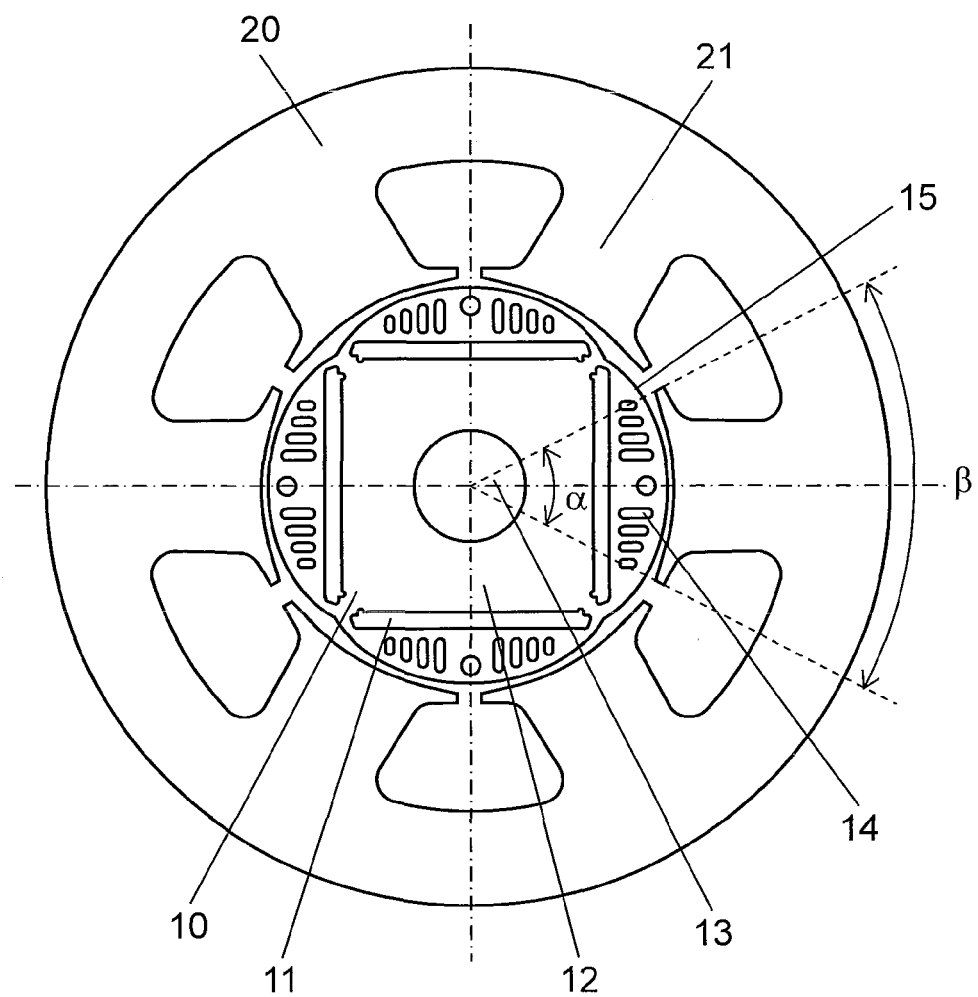
FIG. 2 is a diagram showing a stator and a rotor of the brushless motor according to the first exemplary embodiment of the present invention.
Figure 3:
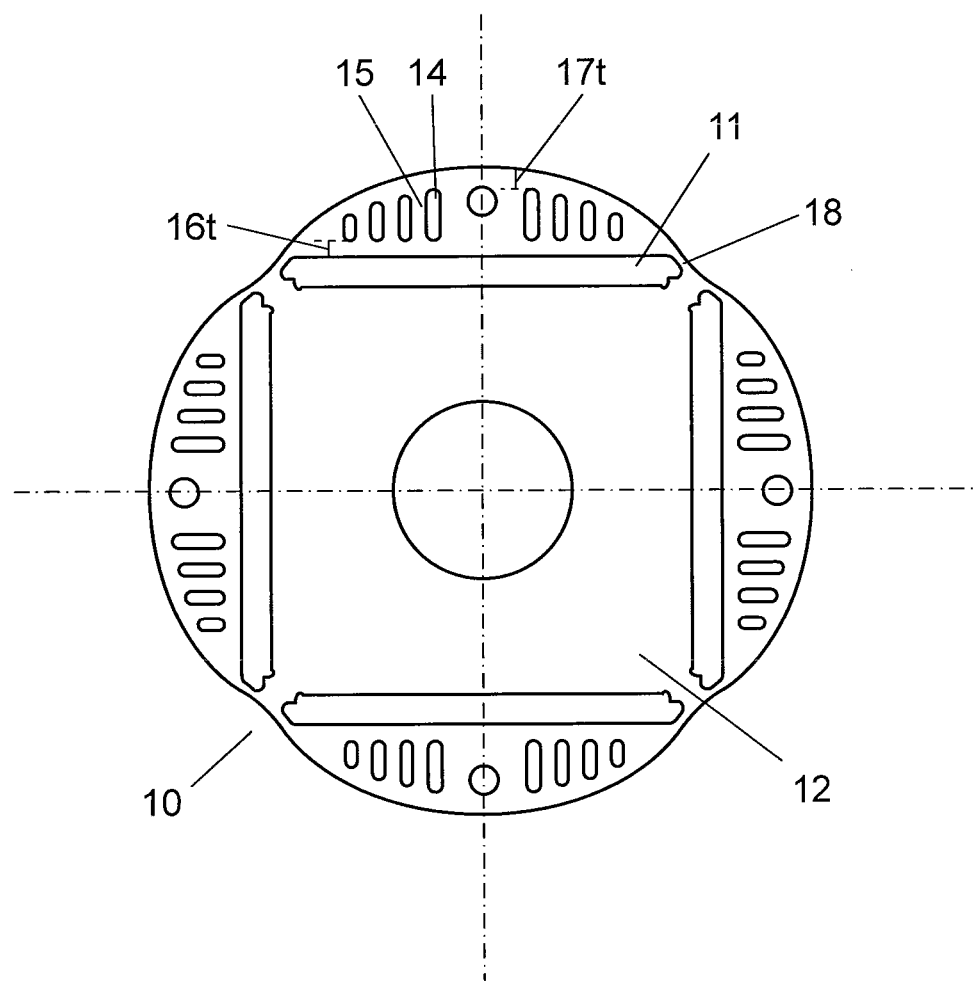
FIG. 3 is a diagram showing the rotor of the brushless motor according to the first exemplary embodiment of the present invention.
Figure 4:
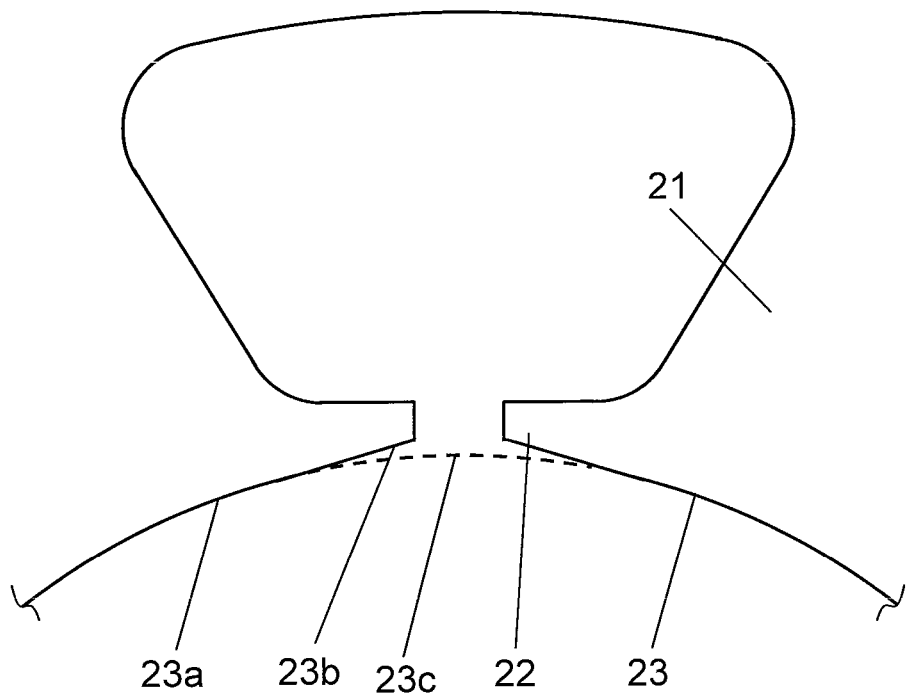
FIG. 4 is an enlarged diagram of a stator slot portion of the permanent magnet brushless motor according to the first exemplary embodiment of the present invention.

Hereinafter, one exemplary embodiment of the present invention will be described with reference to the drawings.
First Exemplary Embodiment
FIG. 1 is a diagram showing the relationship between current phase advance angle and torque ripple of a brushless motor according to the first exemplary embodiment of the present invention and a conventional brushless motor. FIG. 2 is a diagram showing a stator and a rotor of the brushless motor according to the first exemplary embodiment of the present invention. FIG. 3 is a diagram showing the rotor of the brushless motor according to the first exemplary embodiment of the present invention. FIG. 4 is an enlarged diagram of a stator slot portion of the permanent magnet brushless motor according to the first exemplary embodiment of the present invention.

As shown in FIG. 2 and FIG. 3, generally cylindrical rotor 10 is an interior permanent magnet rotor having permanent magnets embedded inside along a longitudinal direction. Rotor core 12 that forms rotor 10, which rotates around shaft 13 as an axis, is formed with a plurality of slits 14 that extend inward from vicinity of outer circumference 15 of the rotor. Core width 17t from a radial outer end of the slit 14 to outer circumference 15 of rotor 10 is substantially equal to core width 16t between a radial inner end of slit 14 and permanent magnet receiving hole 11. Core widths 16t and 17t are about twice a minimum width of core thin portion 18 between permanent magnet receiving hole 11 and an interpolar portion.

Rotor core 12 is formed by stacking electromagnetic steel plates 35H300 with a plate thickness t of 0.35 mm (and a yield strength of 350 N/mm2 or more) to have an outer diameter r of 48 mm. The brushless motor having this rotor core 12 has a speed N of 12000 rpm.

A minimum width b of core thin portion 18 between permanent magnet receiving hole 11 and the interpolar portion has to be larger than a plate thickness t of the electromagnetic steel plates to allow punching of the electromagnetic steel plates that form rotor core 12. Therefore, $b \geq t$, i.e., $b \geq 0.35$ mm. Moreover, $b \geq 0.7$ mm, to satisfy the condition of $b \geq r \times N^2 \times 10^{-10}$, as will be described later. Consequently, the minimum width b is 0.7 mm.

As shown in FIG. 2, an angle α between the lines connecting two slits on both interpolar sides of one pole of rotor core 12 and an axial center of rotor core 12 is set substantially equal to an angle β between the lines connecting the tips of tooth 21 of stator 20 opposite rotor 10 and the axial center. Rotor 10 is molded with a resin.

As shown in FIG. 4, inner circumference 23 of teeth 21 is formed by arcuate portion 23a and linear portion 23b. Linear portion 23b is formed on a radially outer side than imaginary arcuate portion 23c that is an extension of arcuate portion 23a. Thus teeth tips 22 are tilted radially outward.

According to this exemplary embodiment, as described above, the magnetic flux through the radial outer end of slits 14 formed in rotor core 12 is made equal to the magnetic flux through the radial inner end of slits 14, so that there will be no increase in core loss, which may be caused by an uneven distribution of core loss due to concentration of magnetic flux. The magnetic flux distribution of the core is also improved, so that the amount of effective magnetic flux through slits 14 from rotor 10 to teeth 21 of stator 20 is increased, so that the torque output is increased. The brushless motor according to this exemplary embodiment can thus realize large torque, low noise, and low vibration.

In a brushless motor with a conventional configuration, particularly during high speed rotation with field weakening, the torque ripple exceeds about 130% when the current phase angle is advanced by about 80 degrees at a highest speed load point during the field weakening operation as shown in FIG. 1. This is a more than six times increase from the torque ripple of about 20% when the current phase angle is advanced by about 20 degrees.

In contrast, the brushless motor according to this exemplary embodiment shows a torque ripple of about 30% even when the current phase angle is advanced by about 80 degrees, which is less than 1.5 times the torque ripple of about 20% when the current phase angle is advanced by about 20 degrees. This indicates that noise and vibration during high speed rotation can be significantly reduced. Thus the brushless motor according to this exemplary embodiment can realize low noise, low vibration operation over the entire operating range.

Moreover, the configuration according to this exemplary embodiment enables the brushless motor to have a higher mechanical strength, so that the brushless motor can realize low noise, low vibration, and large torque, while maintaining sufficient mechanical strength, even at 10000 rpm or more.

Electric devices with the brushless motor according to this exemplary embodiment mounted therein can take advantage of the high speed rotation capability of the brushless motor as well as its characteristics such as low noise, low vibration, and large torque, and will be high functionality, high performance products.

The brushless motor of the present invention capable of high speed rotation by field weakening operation is characterized in that it is designed to reduce torque ripple at a highest speed load point with current phase advance so that the torque ripple at the highest speed load point is 1 to 1.5 times the torque ripple at a low speed load point.

The motor is configured such that the torque ripple is not increased significantly when the current phase angle is advanced at a highest speed load point during field weakening operation, so that noise and vibration in a high speed region are reduced, therefore low noise, low vibration operation can be realized in the entire operating range.

The present invention provides an interior permanent magnet rotor formed of a generally cylindrical rotor core having a permanent magnet receiving hole, and a plurality of slits extending inward from near an outer circumference of the rotor core, characterized in that a core width from a radial outer end of a slit to the outer circumference of the rotor core is substantially equal to a core width between a radial inner end of the slit to the permanent magnet receiving hole, and that the core widths are about 2 times or more a minimum width of a core thin portion between the permanent magnet receiving hole and an interpolar portion of the rotor core.

This configuration makes the magnetic flux through the radial outer end of each slit equal to the magnetic flux through the radial inner end of the slit, so that there will be no increase in core loss that may be caused by an uneven distribution of core loss due to magnetic flux concentration. Also, the magnetic flux distribution of the core is improved, so that a high efficiency permanent magnet electric motor with little noise and vibration can be provided.

The present invention is further characterized in that the rotor core is formed by stacking electromagnetic steel plates with an yield strength of 350 N/mm$^2$ or more and satisfies $b \geq t$ and $b \geq r \times N^2 \times 10^{-10}$, where t is a plate thickness of the electromagnetic steel plates (mm), b is a minimum width of the core thin portion between a permanent magnet receiving hole and an interpolar portion (mm), r is an outer diameter of the rotor (mm), and N is a speed (rpm).

With this configuration, a brushless motor that can realize low noise, low vibration, and large torque, while maintaining sufficient mechanical strength even at 10000 rpm or more, can be provided.

The present invention is further characterized in that an angle formed by two lines connecting an axial center and two slits at both sides adjoining both interpolar portions of each pole of the rotor core is set substantially equal to an angle formed by two lines connecting the axial center and tips of a tooth of a stator opposite the rotor.

With this configuration, the amount of effective magnetic flux through slits from the rotor to the stator is increased, so that output torque is increased. In high speed rotation, in particular, torque reduction caused by field weakening control can be made less.

The present invention is further characterized in that the rotor has an outer circumferential shape formed by a plurality of arcs having a radius decreasing from a pole center toward an interpolar portion.

With this configuration, the amount of effective magnetic flux through slits from the rotor to the stator is increased, so that output torque is increased. In high speed rotation, in particular, torque reduction caused by the field weakening control can be made less.

The present invention is further characterized in that the rotor is molded with resin.

With this configuration, the rotor can have a higher mechanical strength, which contributes to a reduction in noise and vibration in the brushless motor that rotates at high speed of 10000 rpm or more.

The present invention is further characterized in that teeth tips of the stator opposite the rotor are tilted radially outward.

With this configuration, the waveform of the air gap magnetic flux can be made close to a sine wave, therefore noise and vibration can be reduced.

Industrial Applicability

The brushless motor according to the present invention can realize low noise, low vibration, and large torque while maintaining mechanical strength even during high speed rotation by field weakening, so that it is suitable for applications as domestic appliances where low vibration, low noise, and large torque are desired.

The invention claimed is:

1. A brushless motor capable of high speed rotation by field weakening operation, comprising:
   a rotor comprised of a generally cylindrical rotor core having permanent magnet receiving holes and formed with groups of slits, the slits in each group extending inward between one of the permanent magnet receiving holes and an outer circumference of the rotor core,
   wherein the groups of slits are configured such that an outer width between outer ends of the slits in each group and the outer circumference of the rotor core is substantially equal to an inner width between inner ends of the slit and the permanent magnet receiving hole, and the inner and outer widths are about twice or more wider than a minimum width between the permanent magnet receiving hole and a section of the outer circumference of the rotor core that is located between two adjacent permanent magnet receiving holes, and
   wherein torque ripples observable at a highest speed load point are 1 to 1.5 times higher than torque ripples observable at a low speed load point.

2. The brushless motor according to claim 1, wherein the rotor core is formed of a stack of electromagnetic steel plates with an yield strength of 350 N/mm2 or more, and the stack of electromagnetic steel plates satisfies b≥t and b≥r×N2×10−10, where t is a plate thickness of the electromagnetic steel plates (mm), b is the minimum width (mm), r is an outer diameter of the rotor (mm), and N is a rotational speed of the rotor (rpm).

3. The brushless motor according to claim 1, wherein the groups of slits are configured such that an angle formed by two diameter lines running, respectively, at two circumferentially outermost slits in a group of slits is substantially equal to an angle formed by two diameter lines running, respectively, at two circumferentially opposite ends of a radially innermost tip of a tooth of a stator opposite the rotor.

4. The brushless motor according to claim 1, wherein the outer circumference of the rotor is formed by a plurality of arcuate lines, and in each arcuate lines is formed by a plurality of circular lines diameters of which are smaller towards the sections of the outer circumference of the rotor core that are each located between two adjacent permanent magnet receiving holes.

5. The brushless motor according to claim 1, wherein the rotor is molded with a resin.

6. The brushless motor according to claim 1, wherein the stator opposite the rotor has the teeth with radially innermost tips each having two circumferentially opposite projections that are tilted radially outward.

7. An electric device mounted with the brushless motor according to claim 1.

8. A brushless motor capable of high speed rotation by field weakening operation, comprising means for lowering torque ripples observable at a highest speed load point to 1 to 1.5 times higher than torque ripples observable at a low speed load point.

9. The brushless motor according to claim 8, wherein the means for means for lowering torque ripples comprises a rotor comprised of a generally cylindrical rotor core having permanent magnet receiving holes and formed with groups of slits, the slits in each group extending inward between one of the permanent magnet receiving holes and an outer circumference of the rotor core, and
   wherein the groups of slits are configured such that an outer width between outer ends of the slits in each group and the outer circumference of the rotor core is substantially equal to an inner width between inner ends of the slit and the permanent magnet receiving hole, and the inner and outer widths are about twice or more wider than a minimum width between the permanent magnet receiving hole and a section of the outer circumference of the rotor core that is located between two adjacent permanent magnet receiving holes.

10. The brushless motor according to claim 8, wherein the means for means for lowering torque ripples comprises a rotor comprised of a generally cylindrical rotor core having permanent magnet receiving holes and formed with groups of slits, the slits in each group extending inward between one of the permanent magnet receiving holes and an outer circumference of the rotor core, and
    wherein the groups of slits are configured such that an angle formed by two diameter lines running, respectively, at two circumferentially outermost slits in a group of slits is substantially equal to an angle formed by two diameter lines running, respectively, at two circumferentially opposite ends of a radially innermost tip of a tooth of a stator opposite the rotor.

11. The brushless motor according to claim 8, wherein the means for means for lowering torque ripples comprises a rotor comprised of a generally cylindrical rotor core having permanent magnet receiving holes and formed with groups of slits, the slits in each group extending inward between one of the permanent magnet receiving holes and an outer circumference of the rotor core, and
    wherein the outer circumference of the rotor is formed by a plurality of arcuate lines, and in each arcuate lines is formed by a plurality of circular lines diameters of which are smaller towards the sections of the outer circumference of the rotor core that are each located between two adjacent permanent magnet receiving holes.

* * * * *